(12) United States Patent
Li et al.

(10) Patent No.: US 11,114,972 B2
(45) Date of Patent: Sep. 7, 2021

(54) SYSTEM, METHOD AND DEVICE FOR REFLECTED WAVE CANCELLATION

(71) Applicant: The Florida State University Research Foundation, Inc., Tallahassee, FL (US)

(72) Inventors: Hui Li, Tallahassee, FL (US); Yu Zhang, Tallahassee, FL (US); Yanjun Shi, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 110 days.

(21) Appl. No.: 16/692,222

(22) Filed: Nov. 22, 2019

(65) Prior Publication Data

US 2020/0266750 A1    Aug. 20, 2020

Related U.S. Application Data

(60) Provisional application No. 62/806,469, filed on Feb. 15, 2019.

(51) Int. Cl.
*H02P 29/024* (2016.01)
*H02M 1/32* (2007.01)
*H02M 7/5387* (2007.01)
*H02P 27/08* (2006.01)

(52) U.S. Cl.
CPC .......... *H02P 29/0241* (2016.02); *H02M 1/32* (2013.01); *H02M 7/53871* (2013.01); *H02P 27/08* (2013.01)

(58) Field of Classification Search
CPC .............................. H02P 29/0241; H02M 1/32

USPC ................................................... 318/490, 34
See application file for complete search history.

(56) References Cited

U.S. PATENT DOCUMENTS 4,686,436 A * 8/1987 Archer ................. D06F 37/304
318/400.26

OTHER PUBLICATIONS

Moreira, Alessandro F., et al. "High-frequency modeling for cable and induction motor overvoltage studies in long cable drives." IEEE Transactions on Industry Applications 38.5 (2002): 1297-1306.
MTE Corp, Series A dV/dt Filters Series A—Selection Table & Technical Specifications Guide, 2011, 4 pages.
MTE Corp, Series A dV/dt Filters Series A—User Manual—2004, 37 pages.
GE UPS Systems, SG Series UPS by GE, 2015. Available on-line at: https://ge-upssystems.com/sg-series-ups-by-ge/.

(Continued)

*Primary Examiner* — David Luo
(74) *Attorney, Agent, or Firm* — Meunier Carlin & Curfman LLC

(57) ABSTRACT

An active reflected wave canceller (ARWC, or RWC) can attached to each phase at the output of a motor drive (i.e., inverter). The reflected wave canceller is generally comprised of a pulse generator and a power inductor. The power inductor is used to by-pass the load current, so it doesn't flow through the pulse generator. The pulse generator injects an accurately controlled nanoseconds narrow-width pulse into the system. The injected narrow pulse breaks the rising and falling edge of the inverter output voltage into two steps, which generates two traveling waves along the cable that cancel each other at the motor terminals.

19 Claims, 14 Drawing Sheets

(56) References Cited

OTHER PUBLICATIONS

F. M. Alhuwaishel, A. S. Morsy and P. N. Enjeti, "A New Active Output Filter (AOF) for Variable Speed Constant Frequency (VSCF) Power System in Aerospace Applications," in IEEE Transactions on Power Electronics, vol. 33, No. 2, pp. 1087-1093, Feb. 2018.

W. Chen, X. Yang, J. Xue and F. Wang, "A Novel Filter Topology With Active Motor CM Impedance Regulator in PWM ASD System," in IEEE Transactions on Industrial Electronics, vol. 61, No. 12, pp. 6938-6946, Dec. 2014.

K. K. Yuen, H. S. Chung and V. S. Cheung, "An Active Low-Loss Motor Terminal Filter for Overvoltage Suppression and Common-Mode Current Reduction," in IEEE Transactions on Power Electronics, vol. 27, No. 7, pp. 3158-3172, Jul. 2012.

J. Strom, J. Korhonen, J. Tyster and P. Silventoinen, "Active du/dt—New Output-Filtering Approach for Inverter-Fed Electric Drives," in IEEE Transactions on Industrial Electronics, vol. 58, No. 9, pp. 3840-3847, Sep. 2011.

\* cited by examiner

SYSTEM, METHOD AND DEVICE FOR REFLECTED WAVE CANCELLATION

CROSS REFERENCE TO RELATED APPLICATION

This application claims priority to and benefit of U.S. Provisional Patent Application Ser. No. 62/806,469 filed Feb. 15, 2019, which is fully incorporated by reference and made a part hereof.

GOVERNMENT SUPPORT CLAUSE

This invention was made with government support under grant N00014-16-1-2956 awarded by the Office of Naval Research. The government has certain rights in the invention.

BACKGROUND

Development in Wide-Bandgap (WBG) semiconductors such as silicon carbide (SiC) MOSFET technology makes it possible to apply them to medium to high power motor drives. With proper busbar and gate drive design, a SiC MOSFET can be switched with a dv/dt of 50 V/ns to 100 V/ns. Increased switching speeds result in significant reduction in switching loss. Also, switching frequency can be increased and system cost including the cost of transformer, cooling, gearbox, and mechanical structure can be further reduced by the use of SiC MOSFETs. However, the high dv/dt from an inverter comprised of SiC MOSFETs can cause the reflected wave phenomenon (RWP), as shown in FIG. 1A. RWP generates high voltage spikes at the terminals of a motor connected to the inverter by a cable, which will damage the cable insulation, the motor insulation and/or reduce the lifetime of the motor and/or cable. In conventional Si device based motor drives, RWP only happens when the motor is fed by long cable. But with higher dv/dt from SiC devices, the minimum length to have significant overvoltage reduces to approximately 1-2 meters. For example, with 20 V/ns dv/dt, 1.37 meters of cable can cause an 88% overvoltage.

The reflected wave phenomenon can be divided into partial or full reflection according to the signal rise time $t_r$ and the transmission time $t_t$ for the signal travelling from the inverter side to the motor terminal, as shown in (1). When $t_t$ is larger than one-third of $t_r$, full reflection occurs. The load voltage is determined by the product of the input voltage $V_{in}$ and the reflection coefficient value $\Gamma_L$. Otherwise, partial reflection occurs, in which the load voltage will be smaller than that of the full reflection $$V_{load} = \begin{cases} \left(1 + \frac{3 \cdot t_t \cdot \Gamma_L}{t_r}\right)V_{in}, & t_t < \frac{1}{3}t_r \\ (1+\Gamma_L)V_{in}, & t_t \geq \frac{1}{3}t_r \end{cases} \quad (1)$$

The reflection coefficient value $\Gamma_L$ is defined by (2):

$$\Gamma_L = \frac{Z_L - Z_0}{Z_L + Z_0} \quad (2)$$

where $Z_L$ is the load impedance and $Z_0$ is the cable characteristic impedance. The load impedance is the motor impedance for motor drive applications. Usually the motor impedance is much larger than the cable characteristic impedance, so $\Gamma_L$ is close to 1. Therefore the load voltage (motor voltage) at full reflection will be about twice of the input voltage.

The transmission time $t_t$ is defined in (3):

$$t_t = \frac{l_{cable}}{v} \quad (3)$$

where $l_{cable}$ is the cable length and v is the velocity of the PWM voltage travelling in the cable, which is approximately half of the speed of light.

FIG. 1B presents the relationship between the overvoltage ratio, cable length, and rise time. For the same cable length, a smaller rise time (higher dv/dt) has a larger overvoltage ratio. For example, if the rise time is 400 ns, full reflection will not occur for the cable length less than 20 meters. On the other hand, the dv/dt of a 100 kW SiC inverter can easily reach 17 V/ns, so the rise time will be smaller than 50 ns for 800 V input voltage. The maximum cable length for this SiC inverter to have a full reflection is reduced to 2.5 meters, compared to 20 meters for the 400 ns rise time case.

FIG. 1B shows that high dv/dt characteristics of WBG devices cause full reflection wave phenomenon of SiC motor drives to happen at a shorter cable length. In addition, the higher switching frequency of WBG device and high voltage of SiC MV drive will make the power loss of the passive components of dv/dt limiters increase proportionally.

Generally, the conventional method to mitigate RWP is to apply a passive LCR filter, commonly named as dv/dt filter, as shown in FIG. 2. The dv/dt filters are installed at inverter side to limit the dv/dt by filtering out the high frequency components of inverter out voltage], or to absorb/clamp the voltage reflection. Over time, researchers have been continuously improved the design of the conventional dv/dt filter in terms of cost, power loss, and reliability. However, most of the prior research focused on low power applications. It is challenging to apply passive dv/dt filter to medium to high power SiC motor drive applications due to following reasons: 1) The load current has to flow through inductors of the dv/dt filter. With higher load current, the inductors become bulky. 2) Over-damping is desired for the dv/dt filter to prevent oscillation with its nature resonant frequency. Compared with other types of power filter, a dv/dt filter has much larger resistive power loss. This resistive power loss increases with both dv/dt and switching frequency. As a result, the cooling and reliability of the damping resistors become an issue. 3) When switching frequency increases to 50-100 kHz, the magnetic core loss on the inductors increases significantly.

Therefore, systems, methods and devices are desired to overcome challenges in the art, some of which are described above.

SUMMARY

As disclosed and described herein, a reflected wave canceller (RWC) (also known as an active RWC (ARWC)) can be attached to each phase at the output of a motor drive (i.e., inverter). The reflected wave canceller is comprised of a pulse generator (e.g., an H-bridge pulse generator) and a power inductor. The power inductor is used to by-pass the load current, so it doesn't flow through the pulse generator. The pulse generator injects an accurately controlled nanoseconds narrow-width pulse into the system. The injected narrow pulse breaks the rising and falling edge of the inverter output voltage into two steps, which generates two traveling waves along the cable that cancel each other at the motor terminals. A non-limiting example of a prototype reflected wave canceller is described herein is designed for 100 kW SiC inverters.

Embodiments of a method for mitigating overvoltage at terminals of a load caused by a reflected wave are disclosed herein. One aspect of the method comprises receiving a signal from an inverter, wherein the inverter provides a voltage waveform to a load through a cable having a length; and injecting two voltage pulses into the cable in each switching cycle of the inverter. One of the injected two voltage pulses corresponds to a leading edge of the inverter voltage waveform and another of the two injected voltage pulses corresponds to a trailing edge of the inverter voltage waveform. The injected voltage pulse corresponding to the leading edge of the inverter voltage waveform has a first polarity, first width and first amplitude. The signal results in the voltage pulse corresponding to the leading edge of the inverter voltage waveform breaking the leading edge of the inverter voltage waveform into a first two-step voltages, wherein a reflected voltage at the terminals of the load caused by a first step voltage of the first two-step voltages is substantially canceled by a reflected voltage caused by a second step voltage of the first two-step voltages. The injected voltage pulse corresponding to the trailing edge of the inverter voltage waveform has a second polarity that is opposite the first polarity, a second width and a second amplitude. The signal results in the voltage pulse corresponding to the trailing edge of the inverter voltage waveform breaking the trailing edge of the inverter voltage waveform into a second two-step voltages, wherein a reflected voltage at the terminals of the load caused by a first step voltage of the second two-step voltages is substantially canceled by a reflected voltage caused by a second step voltage of the second two-step voltages.

In some aspects of the embodiments of the method, the first amplitude equals the second amplitude, and wherein the first amplitude and the second amplitude are approximately one-half of an amplitude of the inverter voltage waveform.

In some aspects of the embodiments of the method, the first width equals to the second width, and wherein the first width and the second width are each determined based on a transmission time of the cable, wherein a time period of the first width and the second width is two times the transmission time. The transmission time of the cable is the time for the pulse to travel the length of the cable, which can be determined by calculation or measurement.

In some aspects of the embodiments of the method, the signal comprises a voltage signal or PWM control signal.

Also disclosed herein are embodiments of an active reflected wave canceller. One aspect of the active reflected wave canceller comprises a power inductor, wherein load current from an inverter passes through the power inductor and continues through a cable having a length to a load connected to the cable by terminals and wherein ratings of the power inductor are selected to bypass a fundamental frequency and switching frequency components of the load current; a full bridge circuit, wherein the full bridge circuit generates two voltage pulses that are injected into the cable in each switching cycle wherein one injected voltage pulse corresponds to a leading edge of an inverter voltage waveform and another injected voltage pulse corresponds to a trailing edge of the inverter voltage waveform; and a controller comprising pulse width adjustment circuits and protection circuits, wherein the pulse width adjustment circuits are used to control a time period of each voltage pulse based on different cable lengths, wherein the pulse width adjustment circuits receive a signal from the inverter such that the injected voltage pulse corresponding to the leading edge of the inverter voltage breaks the leading edge of the inverter voltage waveform into a first two-step voltages such that a reflected voltage at the terminals of the load caused by a first step voltage of the first two-step voltages is substantially canceled by a reflected voltage caused by a second step voltage of the first two-step voltages, and wherein the injected voltage pulse corresponding to a trailing edge of the inverter voltage waveform breaks the trailing edge of the inverter voltage waveform into a second two-step voltages such that a reflected voltage at the terminals of the load caused by a first step voltage of the second two-step voltages is substantially canceled by a reflected voltage caused by a second step voltage of the second two-step voltages, and wherein the protection circuits are used to protect the full bridge circuit from overcurrent, overtemperature and short circuits.

In some aspects of the embodiments of the active reflected wave canceller, wherein the signal from the inverter comprises a voltage signal or PWM control signal. The signal from the inverter may comprise pulse-width modulation (PWM) switching signals that can be received from the inverter via an optical fiber input or from sensing circuits.

In some aspects of the embodiments of the active reflected wave canceller, the full bridge circuit generates the two voltage pulses in each switching cycle, wherein the pulse corresponding to a leading edge of the inverter voltage waveform has a first amplitude and the pulse corresponding to the trailing edge of the inverter voltage waveform has a second amplitude, wherein the first amplitude equals the second amplitude and wherein the first amplitude and the second amplitude are approximately one-half of an amplitude of the inverter voltage waveform.

In some aspects of the embodiments of the active reflected wave canceller, the controller determines the time period of the voltage pulse corresponding to the leading edge of the inverter voltage and a time period of the voltage pulse corresponding to the trailing edge of the inverter voltage and wherein the time period is based on a transmission time of the cable, wherein the time period is two times the transmission time. The transmission time of the cable is the time for the pulse to travel the length of the cable, which can be determined by a calculation or by a measurement.

Further disclosed herein are embodiments of a system. One aspect of the system comprises an inverter, wherein the inverter generates an inverter voltage waveform; a load, wherein the load is connected to the inverter at terminals by a cable having a length; and n active reflected wave canceller connected between the inverter and the cable. One embodiment of the active reflected wave canceller comprises a power inductor, wherein load current from an inverter passes through the power inductor and continues through a cable having a length to a load connected to the cable by terminals and wherein ratings of the power inductor are selected to bypass a fundamental frequency and switching frequency components of the load current; a full bridge circuit, wherein the full bridge circuit generates two voltage pulses that are injected into the cable in each switching cycle wherein one injected voltage pulse corresponds to a leading edge of the inverter voltage waveform and another injected voltage pulse corresponds to a trailing edge of the inverter voltage waveform; and a controller comprising pulse width adjustment circuits and protection circuits, wherein the pulse width adjustment circuits are used to control a time period of each voltage pulse based on different cable lengths, wherein the pulse width adjustment circuits receive a signal from the inverter such that the injected voltage pulse corresponding to the leading edge of the inverter voltage breaks the leading edge of the inverter voltage waveform into a first two-step voltages such that a reflected voltage at the terminals of the load caused by a first step voltage of the first two-step voltages is substantially canceled by a reflected voltage caused by a second step voltage of the first two-step voltages, and wherein the injected voltage pulse corresponding to a trailing edge of the inverter voltage waveform breaks the trailing edge of the inverter voltage waveform into a second two-step voltages such that a reflected voltage at the terminals of the load caused by a first step voltage of the second two-step voltages is substantially canceled by a reflected voltage caused by a second step voltage of the second two-step voltages, and wherein the protection circuits are used to protect the full bridge circuit from overcurrent, overtemperature and short circuits.

In some aspects of the embodiments of the system, the load comprises a motor.

In some aspects of the embodiments of the system, the full bridge circuit generates the two voltage pulses in each switching cycle, wherein the pulse corresponding to a leading edge of the inverter voltage waveform has a first amplitude and the pulse corresponding to the trailing edge of the inverter voltage waveform has a second amplitude, wherein the first amplitude equals the second amplitude and wherein the first amplitude and the second amplitude are approximately one-half of an amplitude of the inverter voltage waveform.

In some aspects of the embodiments of the system, the controller determines the time period of the voltage pulse corresponding to the leading edge of the inverter voltage and a time period of the voltage pulse corresponding to the trailing edge of the inverter voltage and wherein the time period is based on a transmission time of the cable, wherein the time period is two times the transmission time. The transmission time of the cable is the time for the pulse to travel the length of the cable which can be determined by a calculation or by a measurement.

In some aspects of the embodiments of the system, the inverter is a poly-phase inverter and an overvoltage caused by the reflected voltage is mitigated at the terminals on each phase by a separate active reflected wave canceller installed on each phase.

In some aspects of the embodiments of the system, the inverter comprises silicon carbide (SiC) devices, wherein the full bridge circuit comprises a GaN full bridge circuit or Si full bridge circuit or SiC full bridge circuit, wherein the power inductor comprises an iron-core power inductor or an air-core power inductor.

In some aspects of the embodiments of the system, the inverter comprises Si devices, wherein the full bridge circuit comprises a GaN full bridge circuit or Si full bridge circuit or SiC full bridge circuit, wherein the power inductor comprises an iron-core power inductor or an air-core power inductor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 12A is non-recovery mode (inductor current decreases to zero) and FIG. 12B is recovery mode (when inductor current does not decrease to zero)

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

Figure 1A:
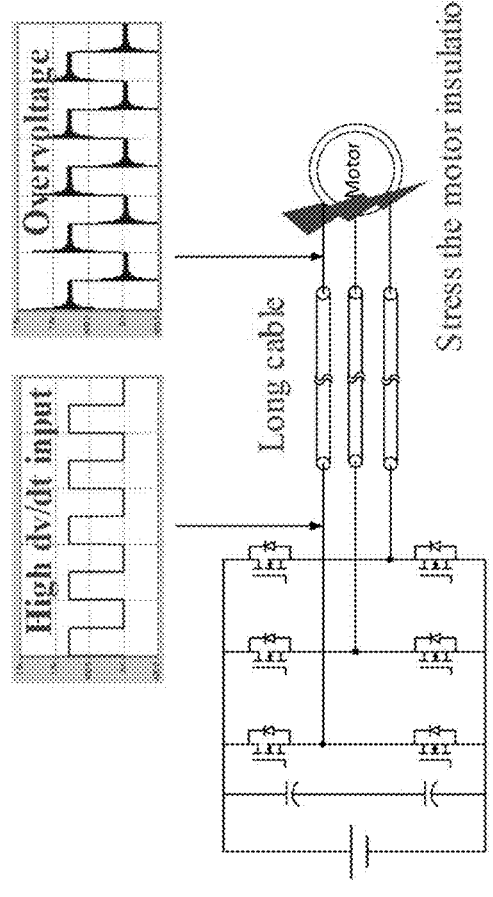
FIG. 1A is a diagram that illustrates the reflected wave phenomena in a system comprised of an inverter, a motor, and a cable that connects the inverter to the motor terminals.
Figure 1A:
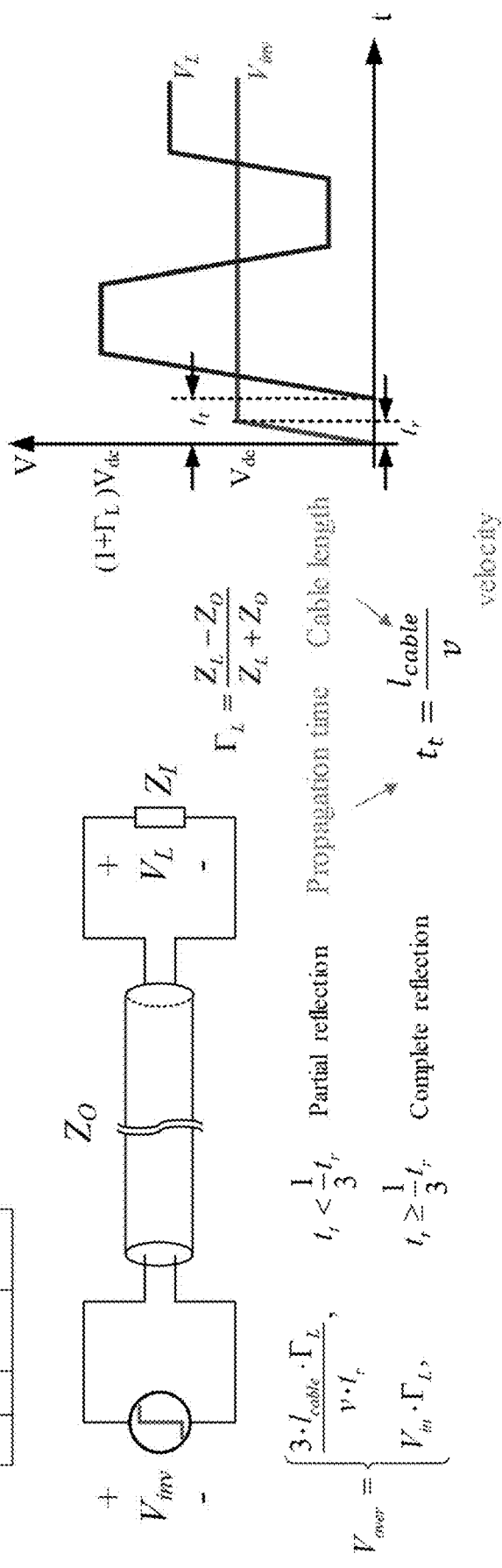
Figure 1B:
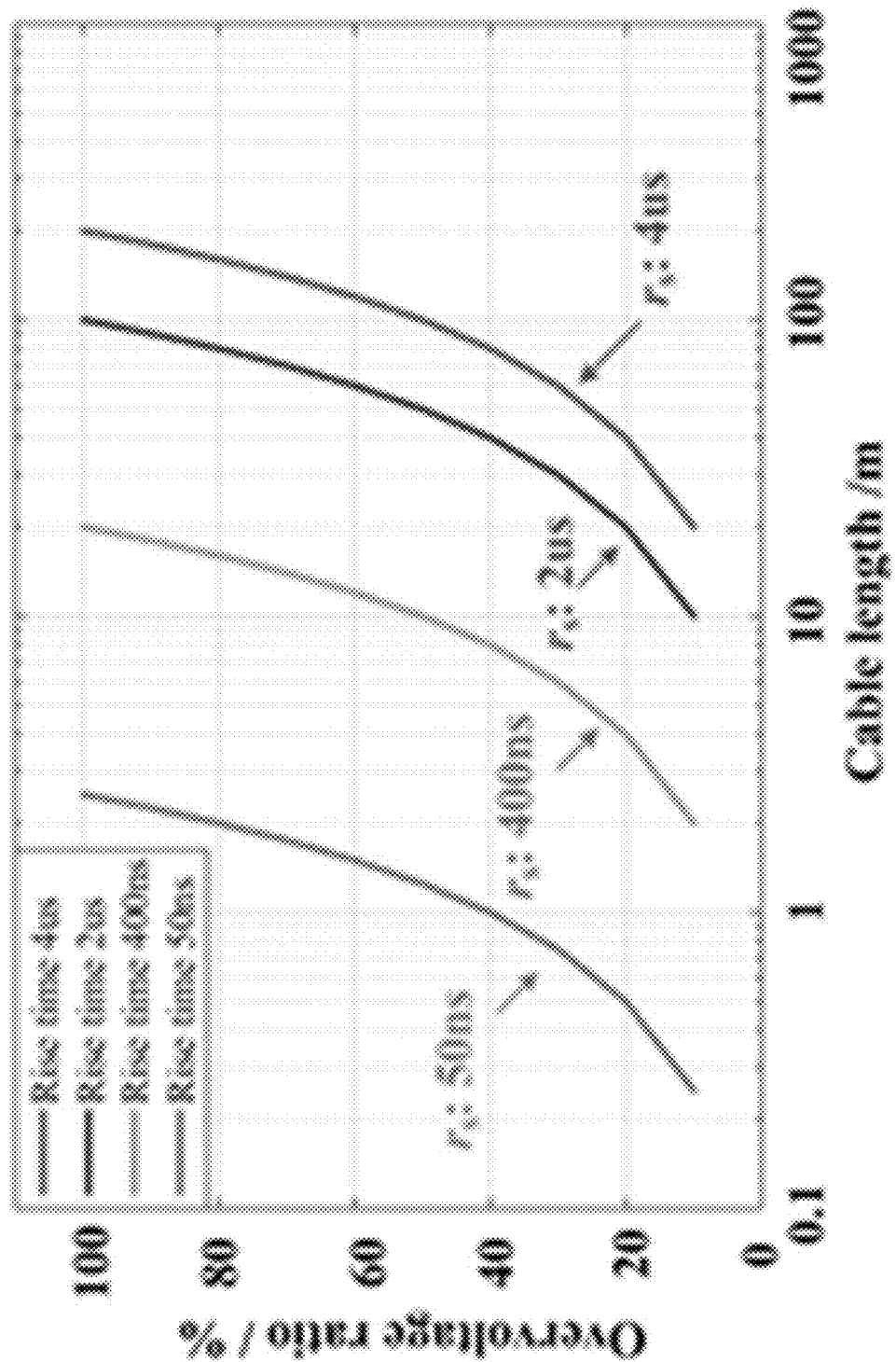
FIG. 1B is a graph that illustrates the relationship between the overvoltage ratio, cable length, and rise time.
Figure 2:
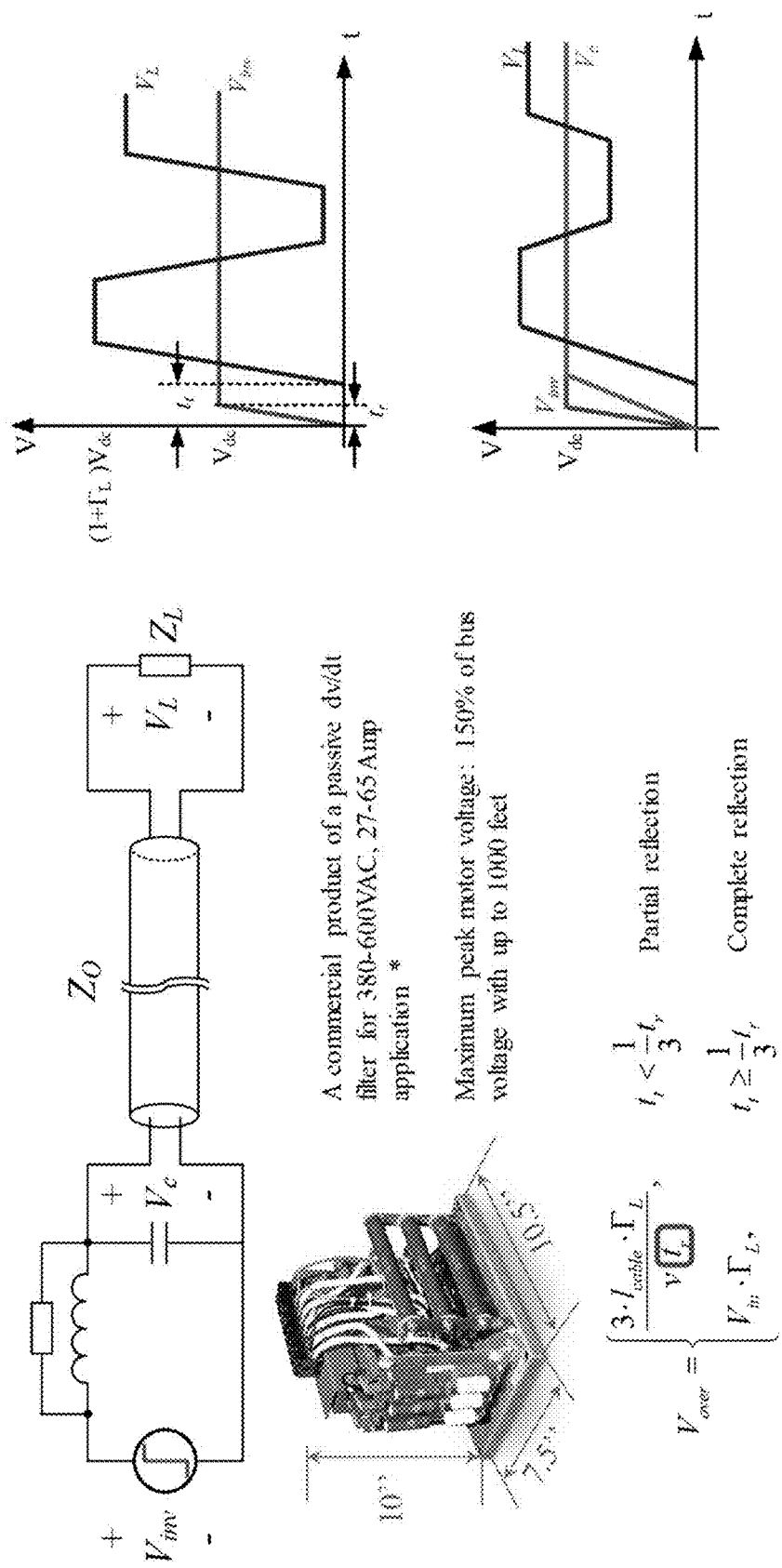
FIG. 2 is an example of the conventional way of mitigating the reflected wave phenomena shown in FIG. 1A using a bulky, heavy passive dv/dt filter.
Figure 3A:
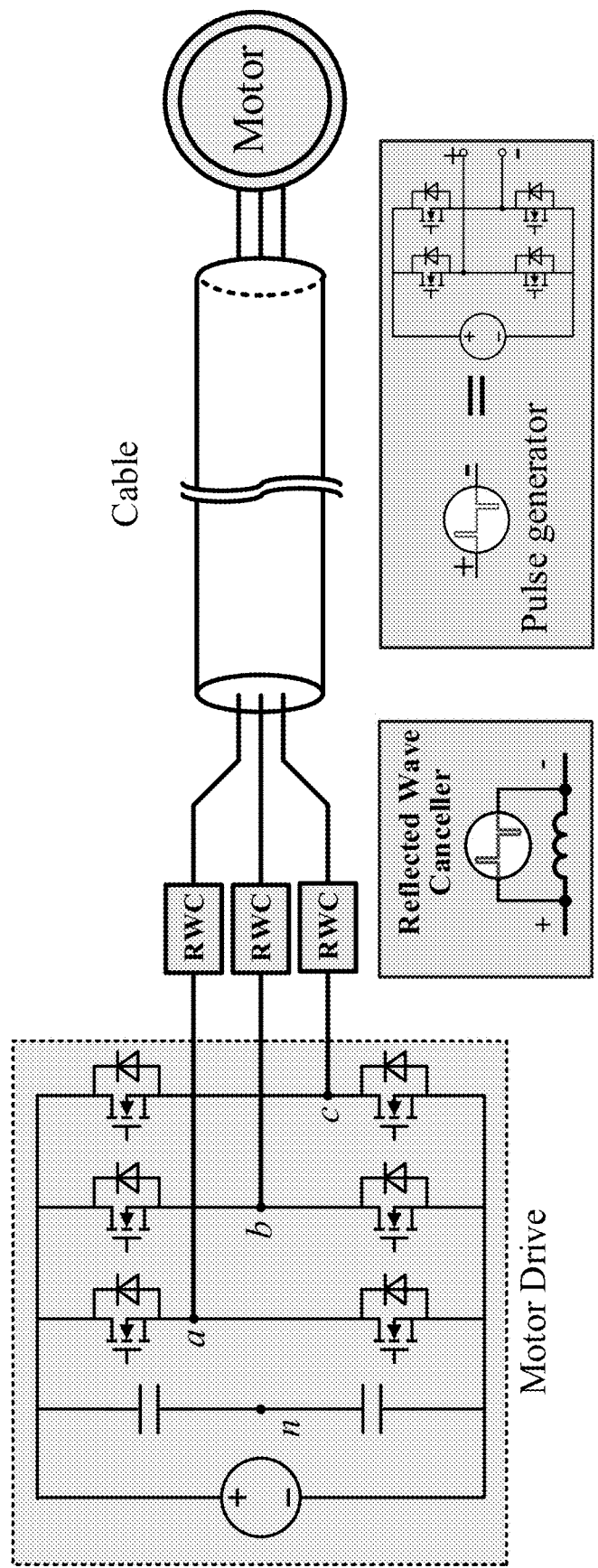
FIG. 3A is a circuit block diagram of an exemplary a reflected wave canceller attached to each phase at the output of a motor drive.
Figure 3B:
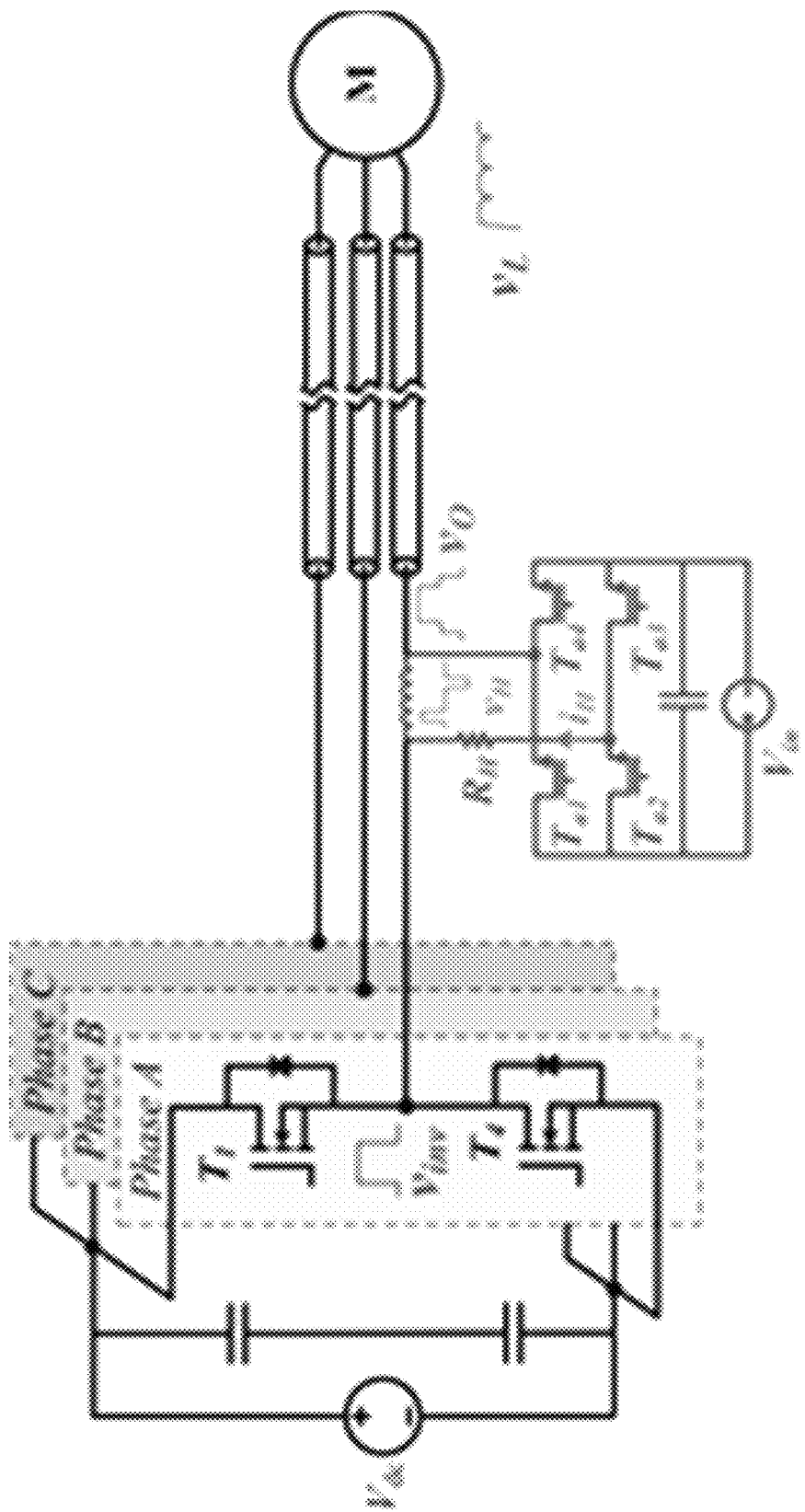
FIG. 3B, illustrates an ARWC (or RWC), shown only on one phase for clarity, comprised of an H-bridge and a small inductor for each phase of a motor drive system, that is inserted between the inverter output and the input of the cable in each phase.

Described and disclosed herein are systems, methods and device for mitigating RWP through an approach that is different from the conventional approach. As shown in FIG. 3A, an active reflected wave canceller (ARWC) is attached to each phase at the output of a motor drive. The reflected wave canceller is comprised of a pulse generator and a power inductor. As shown in FIGS. 3A and 3B, the ARWC (or RWC) is comprised of an H-bridge and a small inductor for each phase of a motor drive system. The motor drive system may be single-phase or poly-phase (e.g., threephase). The ARWC circuit is inserted between the inverter output and the input of the cable in each phase. The H-bridge generates a small voltage pulse with half amplitude of the inverter output voltage and the pulse width is related to the cable length. A small inductor of the ARWC is connected in the main circuit that the majority of the main current will go through this inductor. The resistor $R_H$ represents the resistance in the circuit which includes the $R_{dson}$ of the switches $T_{a1-4}$ and any external resistance if needed.

The operation principle of this active solution is to break the rising and falling edges of the inverter output voltage into two steps with the small voltage pulse generated from the proposed ARWC circuit. The generated voltage pulse width is controlled so that the reflected voltage of the first step voltage is cancelled by that of the second step voltage. In this way, no overvoltage caused by the original inverter output voltage will appear at the motor terminals.

According to the transmission line theory, the voltage at any position of the cable is calculated by (4):

$$v(x, s) = V_{dc}(s) \frac{e^{-\left(\frac{x}{l_{cable}}\right)t_r s} + \Gamma_L e^{-\frac{2l_{cable}-x}{l_{cable}}t_r s}}{1 - \Gamma_L \Gamma_S e^{-2t_r s}} \quad (4)$$

where $\Gamma_L$ is the reflection coefficient at the load side, $\Gamma_S$ is the reflection coefficient at the inverter side, $t_r$ is the transmission time for the voltage travelling in the cable which is defined by $t_r = l_{cable}/v$, $l_{cable}$ is the cable length and v is the velocity of the voltage travelling in the cable, which is approximately half of the speed of light.

The reflection coefficient value $\Gamma_L$ is defined in (5):

$$\Gamma_L = \frac{Z_L - Z_0}{Z_L + Z_0} \quad (5)$$

where $Z_L$ is the load impedance and $Z_0$ is the cable characteristic impedance. The load impedance is the motor impedance for motor drive applications. Usually the motor impedance is much larger than the cable characteristic impedance, so $\Gamma_L$ is close to 1.

The load voltage at the motor terminal without any dv/dt filter can be derived in (6):

$$v_L(l, s) = V_{dc}(s) \frac{(1 + \Gamma_L)e^{-t_r s}}{1 - \Gamma_L \Gamma_S e^{-2t_r s}} \quad (6)$$

Figure 4:
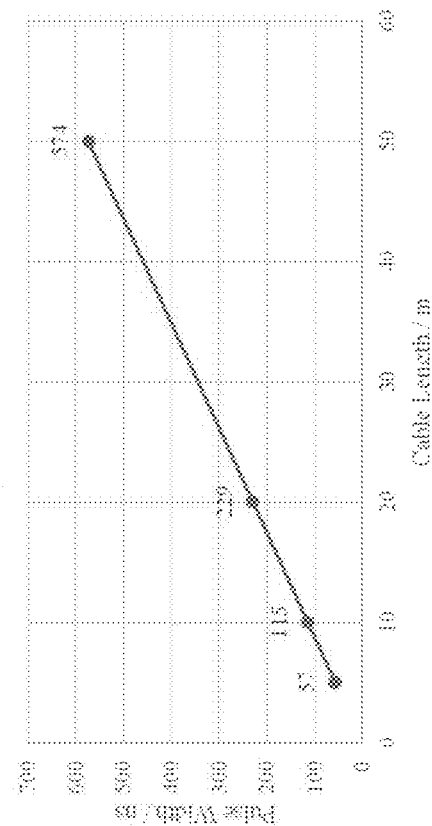
FIG. 4 is a graph illustrating the relationship between cable length and pulse width.

By using the proposed active solution, the rising/falling edge of cable input voltage becomes a two-step waveform with ½ $V_{dc}$ for each step. Therefore the load voltage at the motor terminal is given by (7):

$$v_{L\_active}(l, s) = \frac{V_{dc}(s)}{2} \frac{(1 + \Gamma_L)e^{-t_r s}}{1 - \Gamma_L \Gamma_S e^{-2t_r s}} (1 + e^{-t_d s}) \quad (7)$$

where $t_d$ is the time delay between these two steps, which is also the generated voltage pulse width of the H-bridge circuit. Delay time can be either calculated from the cable length, cable inductance and cable capacitance, or from transmission time $t_r$, which can be also measured with a injected small pulse. This relationship is shown in FIG. 4, which also illustrates that cable capacitance and inductance can affect pulse width. As shown in FIG. 4, pulse width (in nanoseconds) is determined by the equation $t_w = 2l \times \sqrt{LC}$ where l is the length of the cable, L is the per unit length inductance of the cable and C is the per unit length capacitance of the cable. Typical amplitude of the injected pulse is one-half of the amplitude of the output voltage of the inverter.

Letting $t_d = 2t_r$ in Eq. (7) yields:

$$v_{L\_active}(l, s) = \frac{V_{dc}(s)}{2} \frac{(1 + \Gamma_L)e^{-t_r s}}{1 - \Gamma_L \Gamma_S e^{-2t_r s}} (1 + e^{-2t_r s}) = \quad (8)$$

$$\frac{V_{dc}(s) \cdot (1 + \Gamma_L)}{2} \left( e^{-t_r s} + \frac{(1 + \Gamma_L \Gamma_S)e^{-3t_r s}}{1 - \Gamma_L \Gamma_S e^{-2t_r s}} \right)$$

Since $\Gamma_L \Gamma_S$ is close to $-1$, and $\Gamma_L$ is close to 1, (8) becomes $$V_{L\_active}(l, s) \approx V_{dc}(s)e^{-t_r s} \quad (9)$$

Eq. (9) shows that the motor terminal voltage is close to the input voltage without overvoltage.

Figure 5:
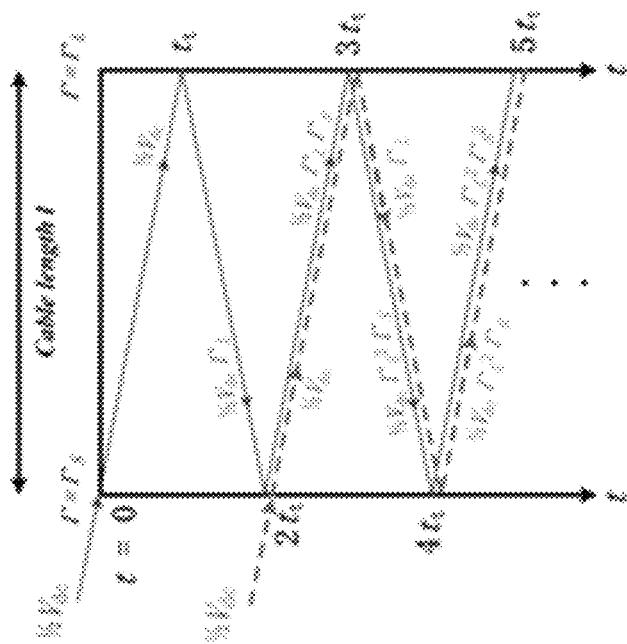
FIG. 5 illustrates a Bewley lattice diagram for an embodiment of the ARWC described herein.

The Bewley lattice diagram for an embodiment of the ARWC described herein is shown in FIG. 5. Since $\Gamma_L \Gamma_S$ is close to $-1$, the load voltage at motor terminal is only related to the first voltage step and its first reflection, the rest of reflected voltages caused by the first step voltage after the delay time $2t_r$ can be cancelled by the second step voltage and its reflected voltages. Therefore, the load voltage can be expressed in (10):

$$v_{L\_active}(l, s) = \frac{V_{dc}(s) \cdot (1 + \Gamma_L)}{2} e^{-t_r s} \approx V_{dc}(s)e^{-t_r s} \quad (10)$$

Figure 6:
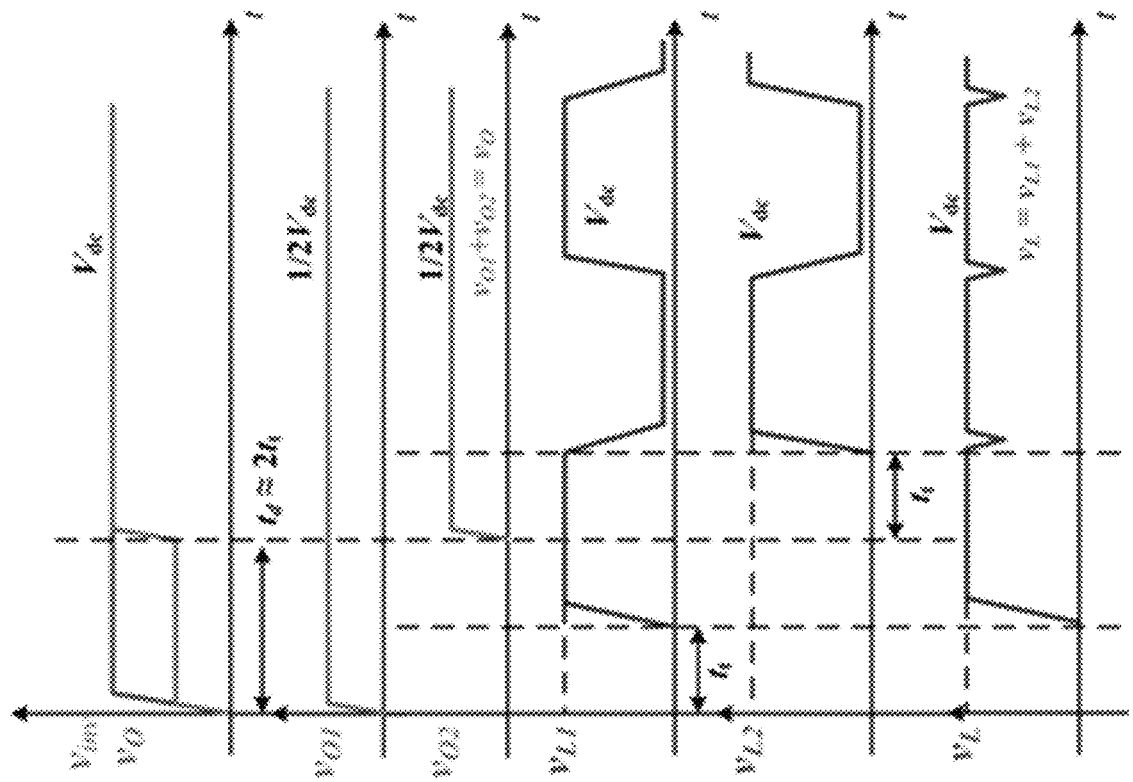
FIG. 6 illustrates waveforms of an embodiment of the ARWC described herein.

Waveforms of an embodiment of the ARWC described herein are presented in FIG. 6, where only the rising edge case is presented since the falling edge case is symmetrical to the rising case. In FIG. 6, $v_{inv}$ is the inverter output voltage with high dv/dt. $v_O$ is the cable input voltage (refer to FIGS. 3A and 3B), which is split into two steps $v_{O1}$ and $v_{O2}$ after the ARWC inserting a small voltage pulse. Each step voltage is transmitted to the load side after the transmission time $t_r$. $v_{L1}$ refers to all the reflected voltages of the vol while $v_{L2}$ is the reflected voltage of $v_{O2}$. The amplitude of $v_{L1}$ and $v_{L2}$ is twice of vol and $v_{O2}$, respectively, because the reflection coefficient is 1. $v_L$ is the motor terminal voltage, which is the sum of $v_{L1}$ and $v_{L2}$. It can be found that if the time delay of these two steps is controlled to $2t_r$, the motor terminal does not see overvoltage because of the cancellation effect of $v_{L1}$ and $v_{L2}$.

Figure 7:
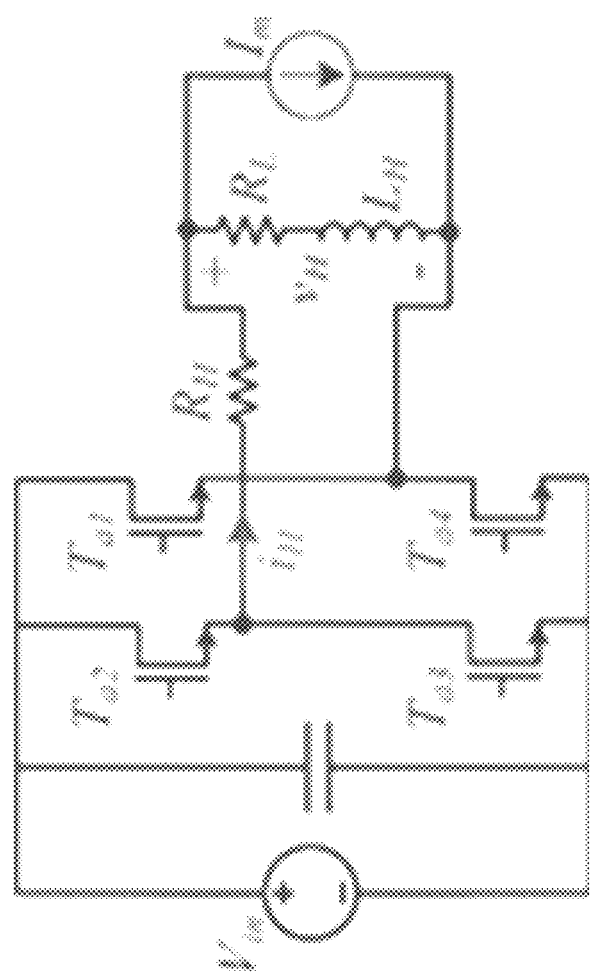
FIG. 7 is an exemplary schematic of one example of an ARWC circuit.

The schematic of one example of an ARWC circuit is presented in FIG. 7. Current source $I_m$ represents the main output current of the inverter. An inductor $L_H$ is connected in the main circuit that the majority of the main current $I_m$ will go through this inductor while the copper loss of $L_H$ is modelled as $R_L$. $R_H$ represents the resistance including $R_{dson}$ of switches $T_{a1-4}$ and external resistance which can be used to prevent the main current $I_m$ flowing into the ARWC circuit.

Figure 8B:
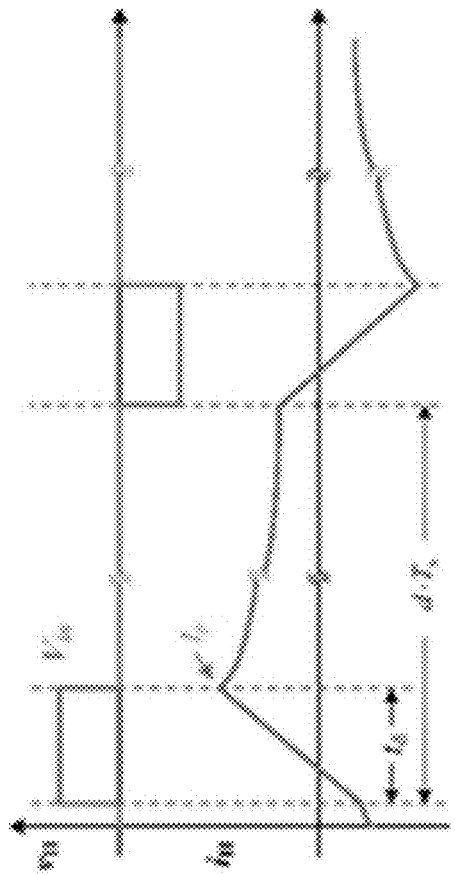
FIGS. 8A and 8B illustrate exemplary ARWC output voltage $v_H$ and current $i_H$ waveforms.
Figure 8A:
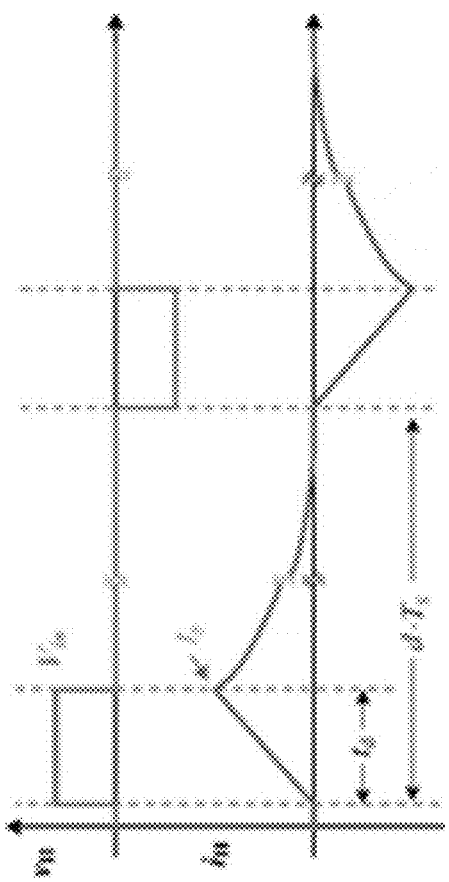

The ARWC output voltage $v_H$ and current $i_H$ waveforms are presented in FIGS. 8A and 8B. The current and voltage rating of $T_{a1-4}$ are selected based on $v_H$ and $i_H$. During the time period $t_d$, $T_{a1}/T_{a3}$ or $T_{a2}/T_{a4}$ are turned on, the output voltage of the ARWC circuit is $V_{in}$, the current increases so peak current of $i_H$ can be derived by (11):

$$I_P = \frac{V_{in}}{R_T}(1 - e^{-\frac{t_d}{\tau}}) \quad (11)$$

where $\tau=L_H/R_T$ and $R_T$ is the total resistance in the circuit which is the sum of $R_H$ and $R_L$.

During the time period $d \cdot T_S - t_d$, the switch $T_{a1}/T_{a2}$ or $T_{a3}/T_{a4}$ is on, so $v_H$ is zero and $i_H$ decreases which can be calculated by $i(t)=I_p e^{-t/\tau}$. $T_S$ is the time period and d is the duty cycle of the PWM waveform which varies in each switching cycle. When the elapsed time $d \cdot T_S - t_d$ is long enough, $i_H$ decreases to zero as shown in FIG. 8A, which is defined as non-recovery mode. FIG. 8B shows $i_H$ in recovery mode where $i_H$ is not decreased to 0 during $d \cdot T_S - t_d$ period if the elapsed time is not long enough. Usually the ARWC is operated in both operation modes because of PWM modulation.

A smaller $R_H$ leads to the recovery mode with lower power loss. However, a smaller $R_H$ will allow more current from the main current $I_m$ to flow into the ARWC circuit which requires higher current rating devices. In this paper $R_H$ is designed to meet $R_H > 100 \, R_L$ so less than 1% of the main current will flow into the ARWC.

$L_H$ sizing is a trade-off design. Larger inductance will result in a smaller $I_P$ which leads to lower current rating devices. However, larger inductance will increase the power loss from $I_m$. Especially for high power inverters, the main current $I_m$ is much larger than $I_P$.

As described herein, $L_H$ is designed to achieve the minimum power loss. The non-recovery operation mode is chosen as the worst case for the power loss calculation. The dominated power loss of this ARWC circuit is associated with $L_H$ which include the inductor copper loss and the power loss dissipated during the elapsed time $dT_S - t_d$. Considering a design case targeted for a 100 kW SiC motor drive with a short cable (~5.5 meter) application, an air-core inductor is selected and its inductance can be derived by (12):

$$L_H = \frac{0.001 N^2 r_c^2}{228 r_c + 254 l} \quad (12)$$

where N is turns number, $r_c$ is the radius of the inductor, l is the length of the inductor.

The copper loss, denoted by $P_1$, is resulted from $I_m$ and can be calculated by (13):

$$P_1 = I_{rms}^2 R_L = \frac{\rho_{cu} l_{wire}}{A_{wire}} I_m^2 \quad (13)$$

where $\rho_{cu}$ is resistivity of copper, $I_{wire}$ is the wire length and $A_{wire}$ is the cross-sectional area.

Usually $t_d \ll \tau$ and $$I_p \approx \frac{V_{in}}{L_H} t_d$$

can be met for short cable application case, therefore the power loss which is dissipated during the elapsed time, denoted by $P_2$, can be calculated by following equation:

$$P_2 = \frac{1}{2} L_H I_p^2 \times 2 \times f_s = L_H \left(\frac{V_{in}}{L_H} t_d\right)^2 f_s = \frac{V_{in}^2}{L_H} t_d^2 f_s \quad (14)$$

Then the dominated power loss associated with $L_H$ is given by (15):

$$P_{Total} = 7.2 \cdot 10^{-4} J^2 \phi^{7/3} L_H^{2/3} + V_{in}^2 t_d^2 f_s L_H^{-1} \quad (15)$$

where J is the current density, $\phi$ is the diameter of the inductor wire, $f_s$ is the switching frequency.

Based on (15), the inductor $L_H$ can be designed to achieve the minimum power loss $$L_H = \left(\frac{2.08 \times 10^3 V_{in}^2 t_d^2 f_s}{J^2 \phi^{\frac{7}{3}}}\right)^{\frac{3}{5}} \quad (16)$$

Figure 9:
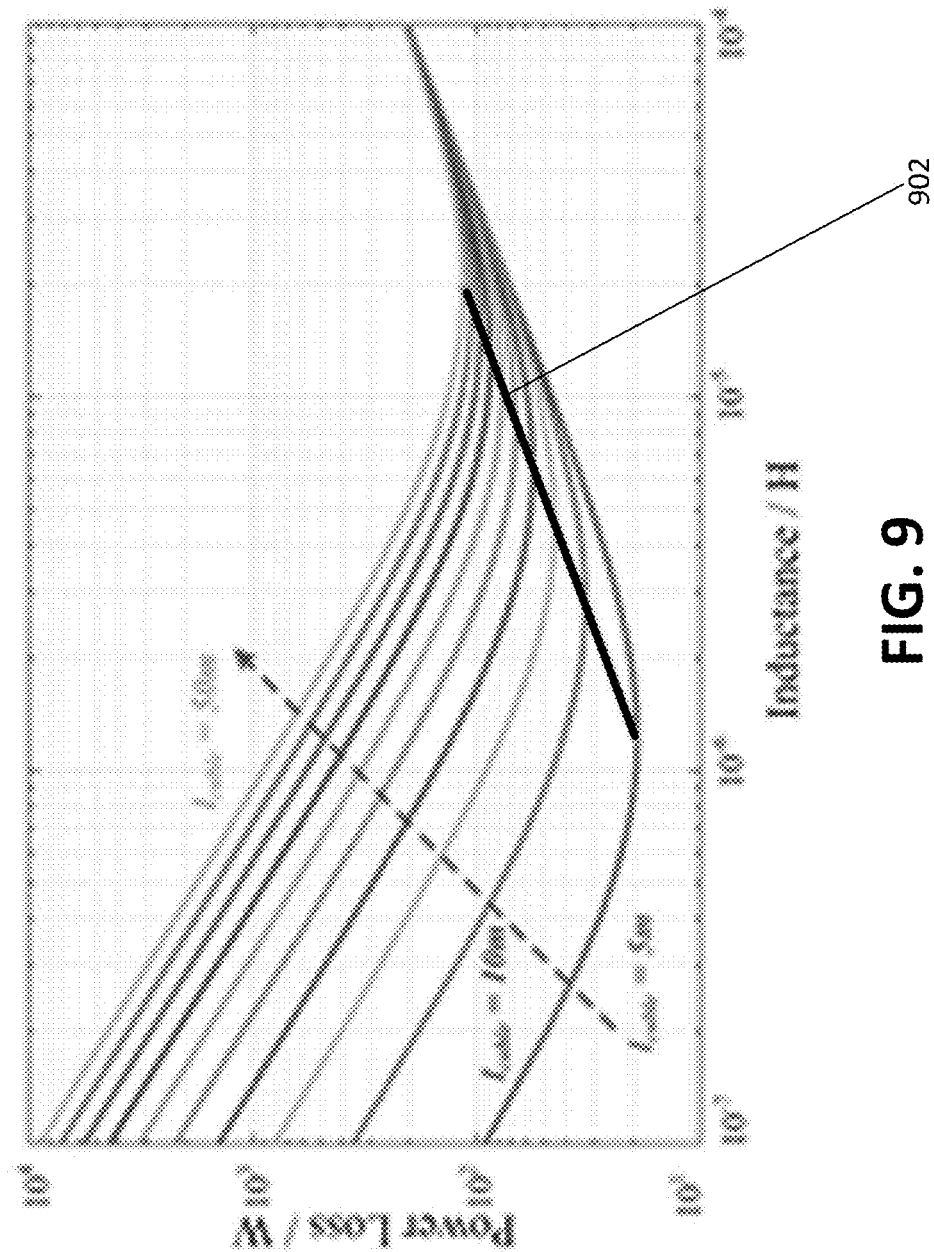
FIG. 9 shows an example of the power loss with different inductance and different cable length.

FIG. 9 shows an example of the power loss with different inductance and different cable length. The calculation is based on 120 A load current (100 kW motor drive case), 50 kHz switching frequency. The dark line 902 is the inductance locus to achieve minimum power loss for different cable length.

As shown and described herein, the power inductor may be air core of it may have a core comprised of iron or other materials. The pulse generator injects an accurately controlled nanoseconds narrow-width pulse into the system. The injected narrow pulse breaks the rising and falling edge of the inverter output voltage into two steps, which generates two traveling waves along the cable that cancel each other at the motor terminals.

A non-limiting example of a prototype reflected wave canceller is described herein is designed for 100 kW SiC inverters. As shown herein, the prototype RWC was developed using GaN devices. The prototype weighs approximately five ounces and its dimensions are approximately 90 mm×54 mm×58 mm. The operation principle of the prototype reflected wave canceller was verified on a testbed comprised of SiC inverter phase leg, 5.5 meters of cable, and a dummy load that emulates high frequency impedance of a motor load. The prototype SiC inverter has a measured dv/dt of 53 V/ns. Experiments show that the motor side voltage spike was suppressed from 832V to 471V, when the peak value of inverter output is 450V.

Figure 10:
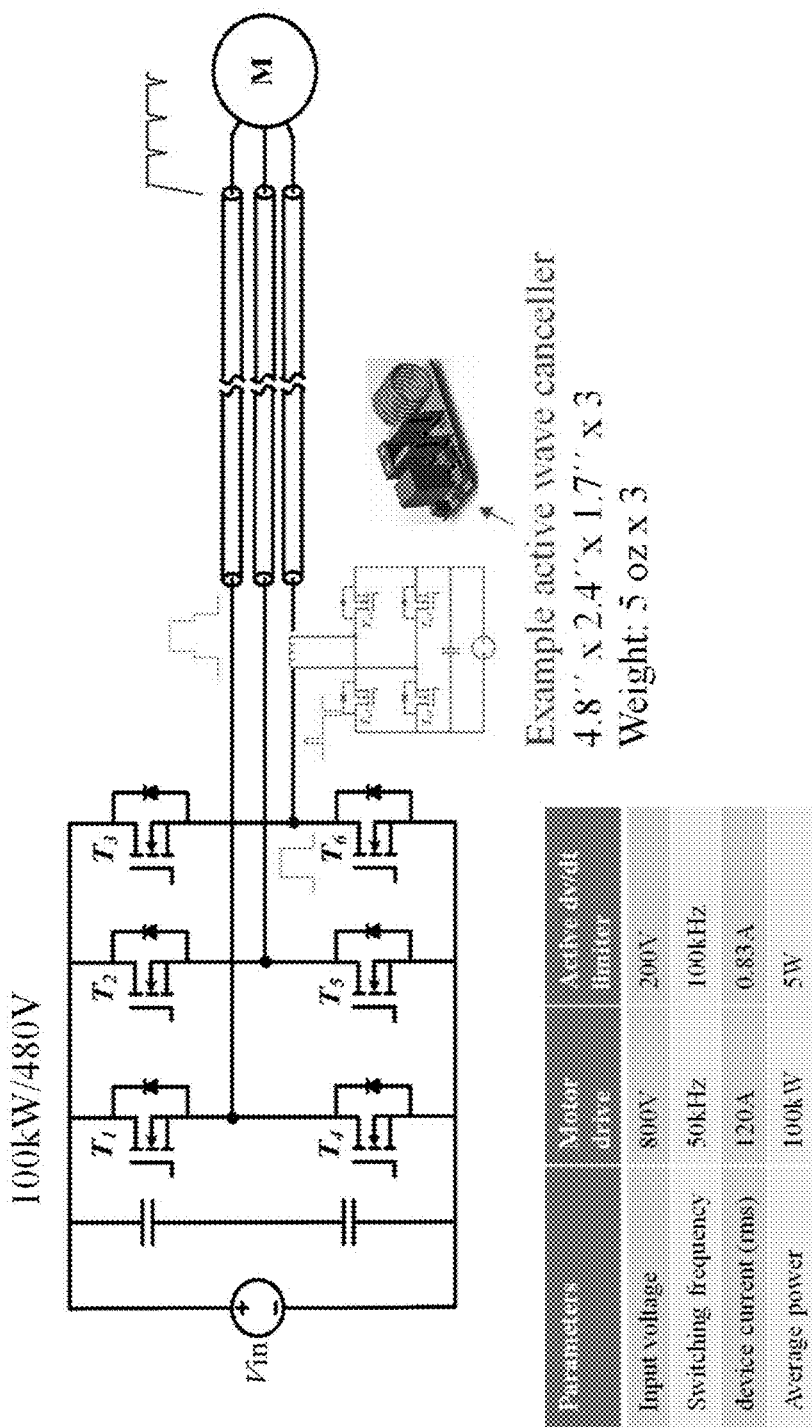
FIG. 10 is an illustration of a reflected wave canceller installed on an output phase of a power inverter.
Figure 11:
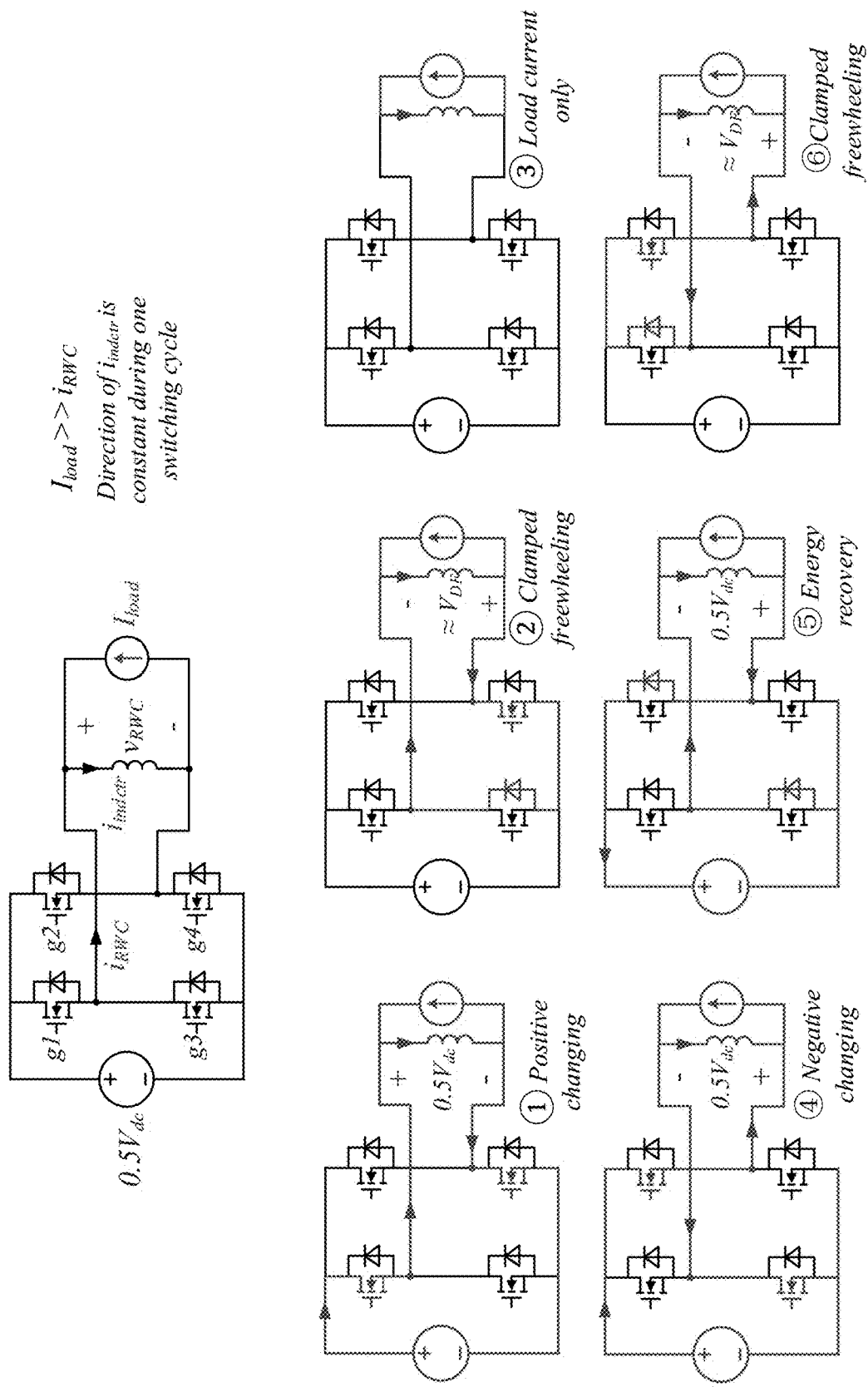
FIG. 11 is an illustration of an equivalent circuit of an exemplary RWC and its switching states.
Figures 12A, 12B:
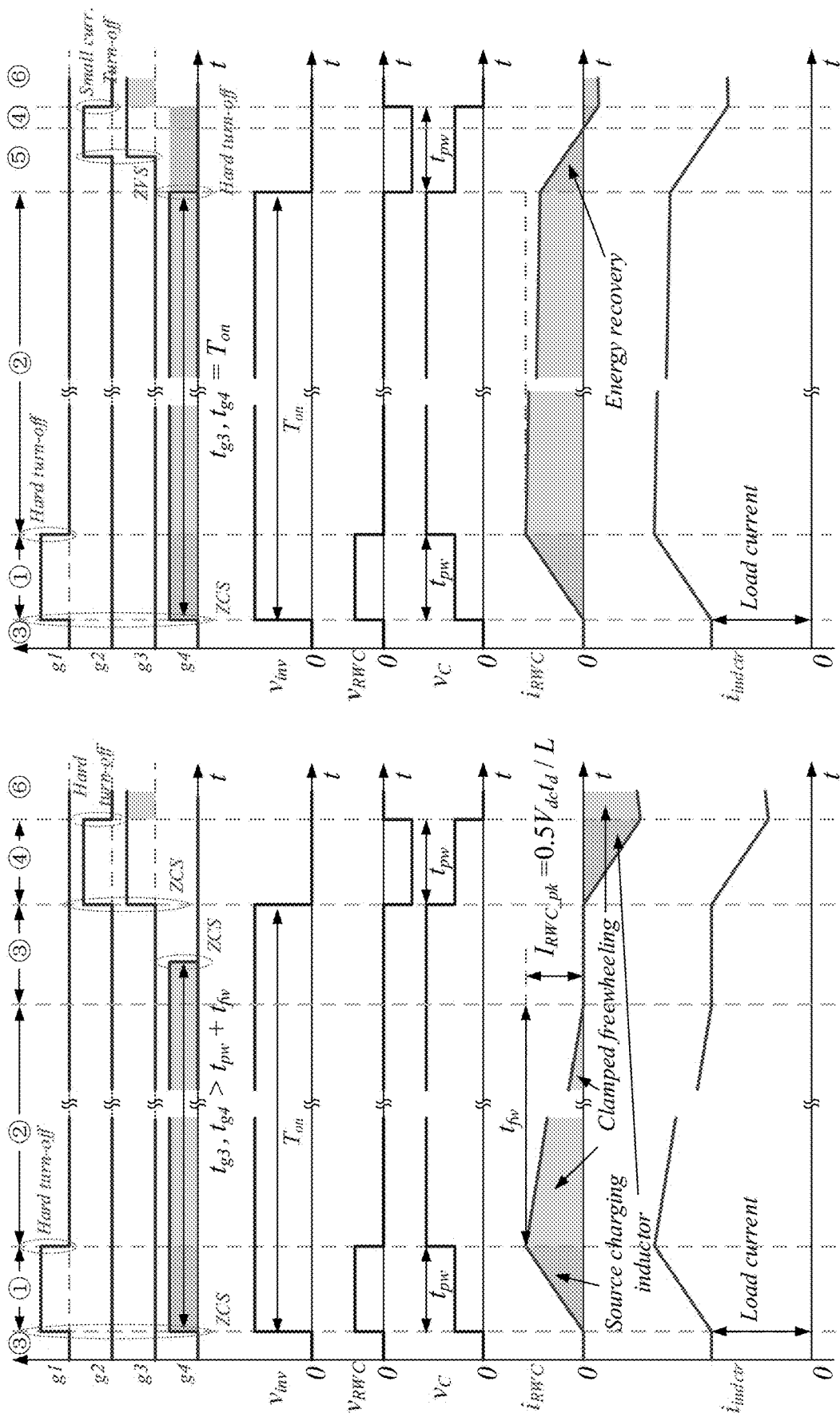
FIGS. 12A and 12B illustrate waveforms of the reflected wave canceller where

FIG. 10 is an illustration of a reflected wave canceller installed on an output phase of a power inverter. It is to be appreciated that the RWC is shown on only one phase to avoid clutter on the figure—a typical installation would include a separate RWC on each phase of the output of the inverter. FIG. 11 is an illustration of an equivalent circuit of a RWC and its switching states. FIGS. 12A and 12B illustrate waveforms of the reflected wave canceller where FIG. 12A shows non-recovery mode and FIG. 12B shows the recovery modes.

EXAMPLE OF A HARDWARE IMPLEMENTATION

Figure 13:
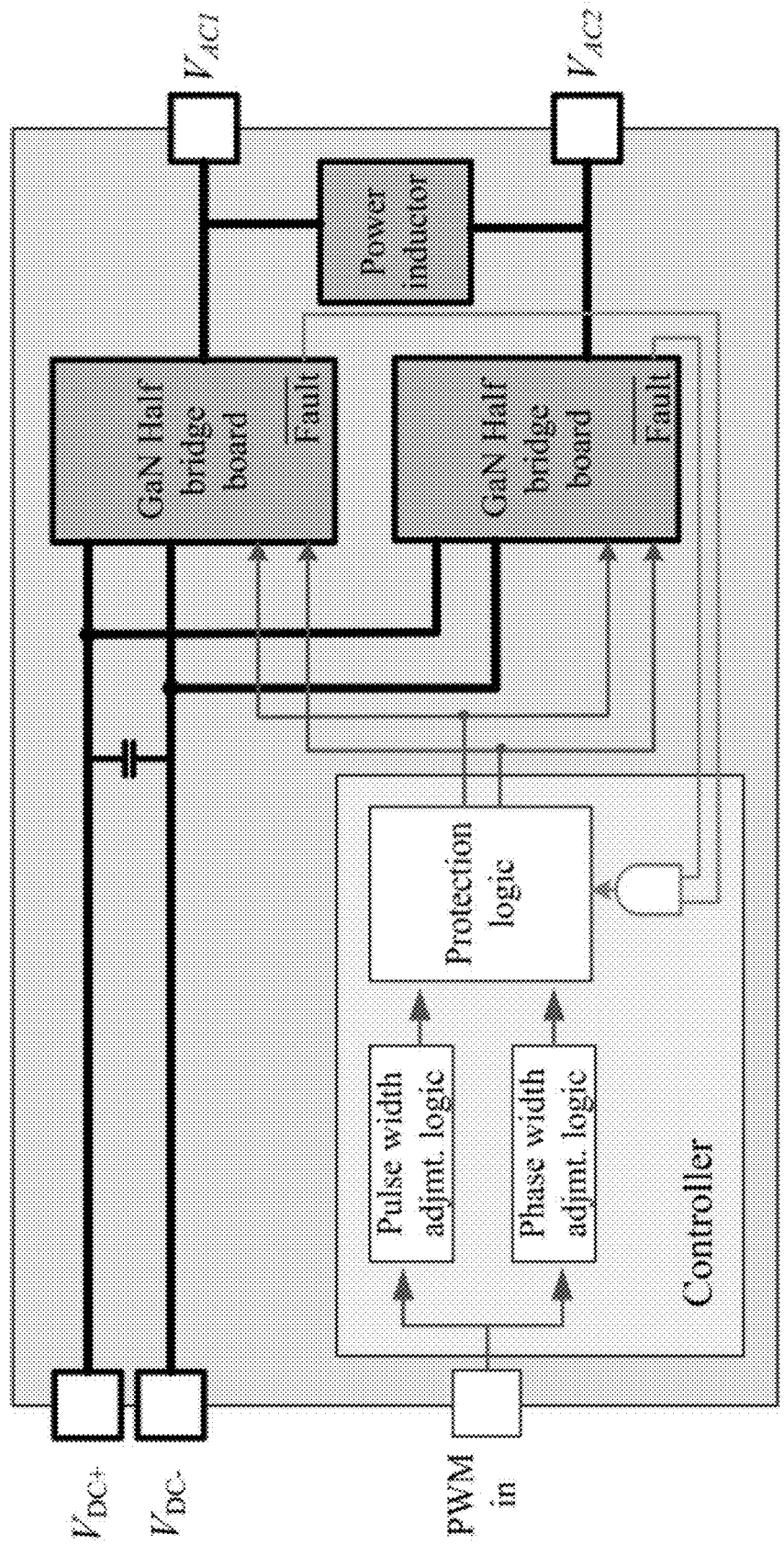
FIG. 13 is a block diagram of an exemplary reflected wave canceller.

The function block diagram of an exemplary reflected wave canceller is presented in FIG. 13. The shown embodiment of a power circuit in FIG. 13 is comprised of a full bridge circuit, a power inductor, and a controller. The power inductor is selected to bypass the fundamental frequency and switching frequency components of cable current. The full bridge circuit is comprised of two half bridge boards. The full bridge circuit generates the narrow pulses of opposite polarity that are injected into the system where the injected narrow pulses break the rising and falling edge of the inverter output voltage into two steps, which generates two traveling waves along the cable that cancel each other at the motor terminals. The controller receives motor drive PWM switching signal from an input (e.g., as shown here, an optical fiber input), and generates gate signals for the full bridge circuit.

Table I, below, is a comparison between an exemplary reflected wave canceller and a commercial dv/dt filter for 480V/100 kW motor drive application:

TABLE I

|  | Weight | Power loss | Dimension | Motor drive frequency | High power components | Communication with main inverter |
| --- | --- | --- | --- | --- | --- | --- |
| Commercial dv/dt filter | 63 kg | 273 W@2k Hz | 861*465*660 mm | 2-5 kHz | LCL with parallel and serial damping | Yes |
| RWC * 3 | 0.42 kg | 57 W@2 kHz 77 W@50 kHz (Assuming no energy recovered) | 90*54*58 mm (each) | 0-500 kHz | L | Yes |

CONCLUSION

Described herein is an active wave canceller that reduces high voltage spikes caused by reflected wave phenomenon in motor drive systems. An example of an ultra-lightweight active reflected wave canceller is described herein as a substitute to conventional bulky passive dv/dt filter for inverter-motor system. An exemplary proof of concept prototype of the reflected wave canceller designed for 100 kW inverters is described herein. The prototype is made with Gallium Nitride (GaN) devices, though other power switching devices comprised of other materials are contemplated within the scope of this disclosure. The exemplary prototype weighs approximately five ounces and its box dimensions are approximately 90 mm×54 mm×58 mm. The operation principle of the exemplary reflected wave canceller was verified on a testbed comprised of a SiC inverter phase leg, 5.5 meters of cable, and a dummy load that emulates high frequency impedance of the motor. The SiC inverter had a measured dv/dt of 53 V/ns. Experiments show the motor side voltage spike was suppressed from 832V to 471V, when the peak value of inverter output is 450V. Although the proposed reflected wave canceller is designed and tested for SiC motor drives, it can also be applied to motor drives made with devices comprised of Si or other materials.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of mitigating overvoltage at terminals of a load caused by a reflected wave, the method comprising:
receiving a signal from an inverter, wherein said inverter provides a voltage waveform to a load through a cable having a length; and
injecting two voltage pulses into the cable in each switching cycle, said one injected two voltage pulses corresponding to a leading edge of the inverter voltage waveform and another of the two injected voltage pulses corresponding to a trailing edge of the inverter voltage waveform, wherein the injected voltage pulse corresponding to the leading edge of the inverter voltage waveform has a first polarity, first width and first amplitude, wherein the signal results in the voltage pulse corresponding to the leading edge of the inverter voltage waveform breaking the leading edge of the inverter voltage waveform into a first two-step voltages, wherein a reflected voltage at the terminals of the load caused by a first step voltage of the first two-step voltages is substantially canceled by a reflected voltage caused by a second step voltage of the first two-step voltages, and
wherein the injected voltage pulse corresponding to the trailing edge of the inverter voltage waveform has a second polarity that is opposite the first polarity, a second width and a second amplitude, wherein the signal results in the voltage pulse corresponding to the trailing edge of the inverter voltage waveform breaking the trailing edge of the inverter voltage waveform into a second two-step voltages, wherein a reflected voltage at the terminals of the load caused by a first step voltage of the second two-step voltages is substantially canceled by a reflected voltage caused by a second step voltage of the second two-step voltages.

2. The method of claim 1, wherein the first amplitude equals the second amplitude, and wherein the first amplitude and the second amplitude are approximately one-half of an amplitude of the inverter voltage waveform.

3. The method of claim 1, wherein the first width equals to the second width, and wherein the first width and the second width are each determined based on a transmission time of the cable, wherein a time period of the first width and the second width is two times the transmission time.

4. The method of claim 3, wherein the transmission time of the cable is the time for the pulse to travel the length of the cable which can be determined by calculation or measurement.

5. The method of claim 1, wherein the signal comprises a voltage signal or PWM control signal.

6. An active reflected wave canceller comprising:
a power inductor, wherein load current from an inverter passes through the power inductor and continues through a cable having a length to a load connected to the cable by terminals and wherein ratings of the power inductor are selected to bypass a fundamental frequency and switching frequency components of the load current;
a full bridge circuit, wherein the full bridge circuit generates two voltage pulses that are injected into the cable in each switching cycle wherein one injected voltage pulse corresponds to a leading edge of an inverter voltage waveform and another injected voltage pulse corresponds to a trailing edge of the inverter voltage waveform; and
a controller comprising pulse width adjustment circuits and protection circuits, wherein the pulse width adjustment circuits are used to control a time period of each voltage pulse based on different cable lengths, wherein the pulse width adjustment circuits receive a signal from the inverter such that the injected voltage pulse corresponding to the leading edge of the inverter voltage breaks the leading edge of the inverter voltage waveform into a first two-step voltages such that a reflected voltage at the terminals of the load caused by a first step voltage of the first two-step voltages is substantially canceled by a reflected voltage caused by a second step voltage of the first two-step voltages, and
wherein the injected voltage pulse corresponding to a trailing edge of the inverter voltage waveform breaks the trailing edge of the inverter voltage waveform into a second two-step voltages such that a reflected voltage at the terminals of the load caused by a first step voltage of the second two-step voltages is substantially canceled by a reflected voltage caused by a second step voltage of the second two-step voltages, and wherein the protection circuits are used to protect the full bridge circuit from overcurrent, overtemperature and short circuits.

7. The active reflected wave canceller of claim 6, wherein the signal from the inverter comprises a voltage signal or PWM control signal.

8. The active reflected wave canceller of claim 7, wherein the signal from the inverter comprises pulse-width modulation (PWM) switching signals that can be received from the inverter via an optical fiber input or from sensing circuits.

9. The active reflected wave canceller of claim 6, wherein the full bridge circuit generates the two voltage pulses in each switching cycle, wherein the pulse corresponding to a leading edge of the inverter voltage waveform has a first amplitude and the pulse corresponding to the trailing edge of the inverter voltage waveform has a second amplitude, wherein the first amplitude equals the second amplitude and wherein the first amplitude and the second amplitude are approximately one-half of an amplitude of the inverter voltage waveform.

10. The active reflected wave canceller of claim 6, wherein the controller determines the time period of the voltage pulse corresponding to the leading edge of the inverter voltage and a time period of the voltage pulse corresponding to the trailing edge of the inverter voltage and wherein the time period is based on a transmission time of the cable, wherein the time period is two times the transmission time.

11. The active reflected wave canceller of claim 10, wherein the transmission time of the cable is the time for the pulse to travel the length of the cable which can be determined by a calculation or by a measurement.

12. A system comprising:
an inverter, wherein the inverter generates an inverter voltage waveform;
a load, wherein the load is connected to the inverter at terminals by a cable having a length; and
an active reflected wave canceller connected between the inverter and the cable, said active reflected wave canceller comprising:
a power inductor, wherein load current from an inverter passes through the power inductor and continues through a cable having a length to a load connected to the cable by terminals and wherein ratings of the power inductor are selected to bypass a fundamental frequency and switching frequency components of the load current;
a full bridge circuit, wherein the full bridge circuit generates two voltage pulses that are injected into the cable in each switching cycle wherein one injected voltage pulse corresponds to a leading edge of the inverter voltage waveform and another injected voltage pulse corresponds to a trailing edge of the inverter voltage waveform; and
a controller comprising pulse width adjustment circuits and protection circuits, wherein the pulse width adjustment circuits are used to control a time period of each voltage pulse based on different cable lengths, wherein the pulse width adjustment circuits receive a signal from the inverter such that the injected voltage pulse corresponding to the leading edge of the inverter voltage breaks the leading edge of the inverter voltage waveform into a first two-step voltages such that a reflected voltage at the terminals of the load caused by a first step voltage of the first two-step voltages is substantially canceled by a reflected voltage caused by a second step voltage of the first two-step voltages, and
wherein the injected voltage pulse corresponding to a trailing edge of the inverter voltage waveform breaks the trailing edge of the inverter voltage waveform into a second two-step voltages such that a reflected voltage at the terminals of the load caused by a first step voltage of the second two-step voltages is substantially canceled by a reflected voltage caused by a second step voltage of the second two-step voltages, and wherein the protection circuits are used to protect the full bridge circuit from overcurrent, overtemperature and short circuits.

13. The system of claim 12, wherein the load comprises a motor.

14. The system of claim 12, wherein the full bridge circuit generates the two voltage pulses in each switching cycle, wherein the pulse corresponding to a leading edge of the inverter voltage waveform has a first amplitude and the pulse corresponding to the trailing edge of the inverter voltage waveform has a second amplitude, wherein the first amplitude equals the second amplitude and wherein the first amplitude and the second amplitude are approximately one-half of an amplitude of the inverter voltage waveform.

15. The system of claim 12, wherein the controller determines the time period of the voltage pulse corresponding to the leading edge of the inverter voltage and a time period of the voltage pulse corresponding to the trailing edge of the inverter voltage and wherein the time period is based on a transmission time of the cable, wherein the time period is two times the transmission time.

16. The system of claim 15, wherein the transmission time of the cable is the time for the pulse to travel the length of the cable which can be determined by a calculation or by a measurement.

17. The system of claim 12, wherein the inverter is a poly-phase inverter and an overvoltage caused by the reflected voltage is mitigated at the terminals on each phase by a separate active reflected wave canceller installed on each phase.

18. The system of claim 12, wherein the inverter comprises silicon carbide (SiC) devices, wherein the full bridge circuit comprises a GaN full bridge circuit or Si full bridge circuit or SiC full bridge circuit, wherein the power inductor comprises an iron-core power inductor or an air-core power inductor.

19. The system of claim 12, wherein the inverter comprises Si devices, wherein the full bridge circuit comprises a GaN full bridge circuit or Si full bridge circuit or SiC full bridge circuit, wherein the power inductor comprises an iron-core power inductor or an air-core power inductor.

* * * * *